United States Patent
Cheng et al.

(10) Patent No.: US 10,027,729 B2
(45) Date of Patent: Jul. 17, 2018

(54) UNICAST SUPPORT IN PROSE DIRECT DEVICE-TO-DEVICE COMMUNICATION

(71) Applicant: QUALCOMM Incorporated, San Diego, CA (US)

(72) Inventors: Hong Cheng, Bridgewater, NJ (US); Sudhir Kumar Baghel, Bridgewater, NJ (US); Michaela Vanderveen, Tracy, CA (US); Haris Zisimopoulos, London (GB); Shailesh Patil, Raritan, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/158,483

(22) Filed: May 18, 2016

(65) Prior Publication Data
US 2016/0344782 A1 Nov. 24, 2016

Related U.S. Application Data

(60) Provisional application No. 62/165,865, filed on May 22, 2015.

(51) Int. Cl.
*H04L 29/06* (2006.01)
*H04W 4/06* (2009.01)
(Continued)

(52) U.S. Cl.
CPC ...... *H04L 65/4076* (2013.01); *H04L 61/6022* (2013.01); *H04L 63/0428* (2013.01);
(Continued)

(58) Field of Classification Search
CPC . H04L 61/6022; H04L 63/0428; H04L 63/10; H04L 65/4076; H04W 4/005; H04W 4/06; H04W 4/08; H04W 76/023
See application file for complete search history.

(56) References Cited

U.S. PATENT DOCUMENTS

| 2011/0069971 A1* | 3/2011 | Kim | H04B 10/1149 398/172 |
| 2011/0194697 A1* | 8/2011 | Pang | H04L 9/0833 380/279 |

(Continued)

FOREIGN PATENT DOCUMENTS

WO 2015020386 A1 2/2015

OTHER PUBLICATIONS

ETRI: "Misallignment of Layer 2 ID for D2D Comnunication," 3GPP Draft; R2-143583 Misallignment of Layer 2 ID for D2d Communication, 3rd Generation Partnership Project (3GPP), Mobile Competence Centre ; 650, Route Des Lucioles ; F-06921 Sophia-Antipolis Cedex vol. RAN WG2, No. Dresden, Germany; Aug. 18, 2014-Aug. 22, 2014 Aug. 17, 2014 (Aug. 17, 2014), XP050794567, Retrieved from the Internet: URL:http://www.3gpp.org/ftp/Meetings 3GPP_SYNC/RAN2/Docs/ - - [retrieved on Aug. 17, 2014].

(Continued)

*Primary Examiner* — Kashif Siddiqui
(74) *Attorney, Agent, or Firm* — Clint R. Morin; Arent Fox, LLP

(57) ABSTRACT

The present disclosure enables a multicast and/or unicast transmitting UE to configure a multicast device-to-device communication and/or the unicast device-to-device communication such that UE may distinguish between the unicast and multicast device-to-device communications. The apparatus receives a unicast device-to-device communication including a destination identifier. The apparatus also receives a multicast device-to-device communication including the destination identifier. The apparatus differentiates the unicast device-to-device communication from the multicast device-to-device communication based on infor- (Continued)

mation provided in a header of the unicast device-to-device communication.

16 Claims, 15 Drawing Sheets

(51) Int. Cl.
    *H04L 29/12*     (2006.01)
    *H04W 4/08*     (2009.01)
    *H04W 4/70*     (2018.01)
    *H04W 76/14*     (2018.01)

(52) U.S. Cl.
    CPC ............... *H04L 63/10* (2013.01); *H04W 4/06* (2013.01); *H04W 4/08* (2013.01); *H04W 4/70* (2018.02); *H04W 76/14* (2018.02)

(56) References Cited

U.S. PATENT DOCUMENTS

| | | | |
|---|---|---|---|
| 2012/0224860 A1* | 9/2012 | Kim | H04B 10/1149 398/128 |
| 2013/0229969 A1* | 9/2013 | Quan | H04L 12/189 370/312 |
| 2015/0085697 A1 | 3/2015 | Gulati et al. | |
| 2015/0124646 A1 | 5/2015 | Yun et al. | |
| 2015/0305012 A1* | 10/2015 | Yi | H04L 67/1078 370/329 |
| 2015/0334555 A1* | 11/2015 | Seo | H04W 84/18 370/254 |

OTHER PUBLICATIONS

International Search Report and Written Opinion—PCT/US2016/033265—ISA/EPO—Oct. 19, 2016.

* cited by examiner

| Bits | Description |
|---|---|
| 000 | IP Multicast |
| 001 | ARP |
| 010-111 | IP Unicast |

UNICAST SUPPORT IN PROSE DIRECT DEVICE-TO-DEVICE COMMUNICATION

CROSS-REFERENCE TO RELATED APPLICATION(S)

This application claims the benefit of U.S. Provisional Application Ser. No. 62/165,865, entitled "UNICAST SUPPORT IN PROSE DIRECT DEVICE-TO-DEVICE COMMUNICATION" and filed on May 22, 2015, which is expressly incorporated by reference herein in its entirety.

BACKGROUND

Field

The present disclosure relates generally to communication systems, and more particularly, to unicast support in ProSe direct device-to-device communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In a device-to-device communications system, a receiving user equipment (UE) may simultaneously receive a multicast device-to-device communication and a unicast device-to-device communication. When this occurs, the receiving UE may not be able to distinguish between the multicast device-to-device communication and a unicast device-to-device communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In general, it is possible that a receiving UE may receive packets associated with a multi cast device-to-device communication and unicast device-to-device communication at the same time. If the destination Layer 2 Group ID of the multicast device-to-device and the destination Layer 2 UE ID of the unicast device-to-device communication happen to collide (e.g., take the same value), the receiving UE may discard one or more of the received communications because the security protection may not check out. However, if a unicast data packet included in the unicast device-to-device communication does not have security protection, the unicast data packet received by a receiving UE might advance to higher layer, e.g. IP layer. Such behavior may cause potential radio link control (RLC) layer and a packet data convergence protocol (PDCP) layer counters to be out of order, and thus cause packet drop.

Thus, there is a need to enable a receiving UE to differentiate a unicast device-to-device communication from a multicast device-to-device communication when the two communications are received simultaneously.

In order to provide a solution to this problem, the present disclosure enables a multicast and/or unicast transmitting UE to configure a multicast device-to-device communication and/or the unicast device-to-device communication such that UE may distinguish between the unicast and multicast device-to-device communications. For example, information in the header of one or more of the unicast device-to-device communication and/or the multicast device-to-device communication may be configured such that that two communication will be distinguishable from one another by a receiving UE.

In an aspect of the disclosure, a method, a computer-readable medium, and an apparatus are provided. The apparatus receives a unicast device-to-device communication including a destination identifier. The apparatus also receives a multicast device-to-device communication including the destination identifier. The apparatus differentiates the unicast device-to-device communication from the multicast device-to-device communication based on information provided in a header of the unicast device-to-device communication.

In another aspect, the apparatus configures a data packet intended for a receiver device such that a unicast device-to-device communication and a multicast device-to-device communication will be distinguishable by the receiver device. The apparatus also transmits the data packet to the receiver device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a PDCP header in accordance with one aspect of the present disclosure.

DETAILED DESCRIPTION

Figure 1:
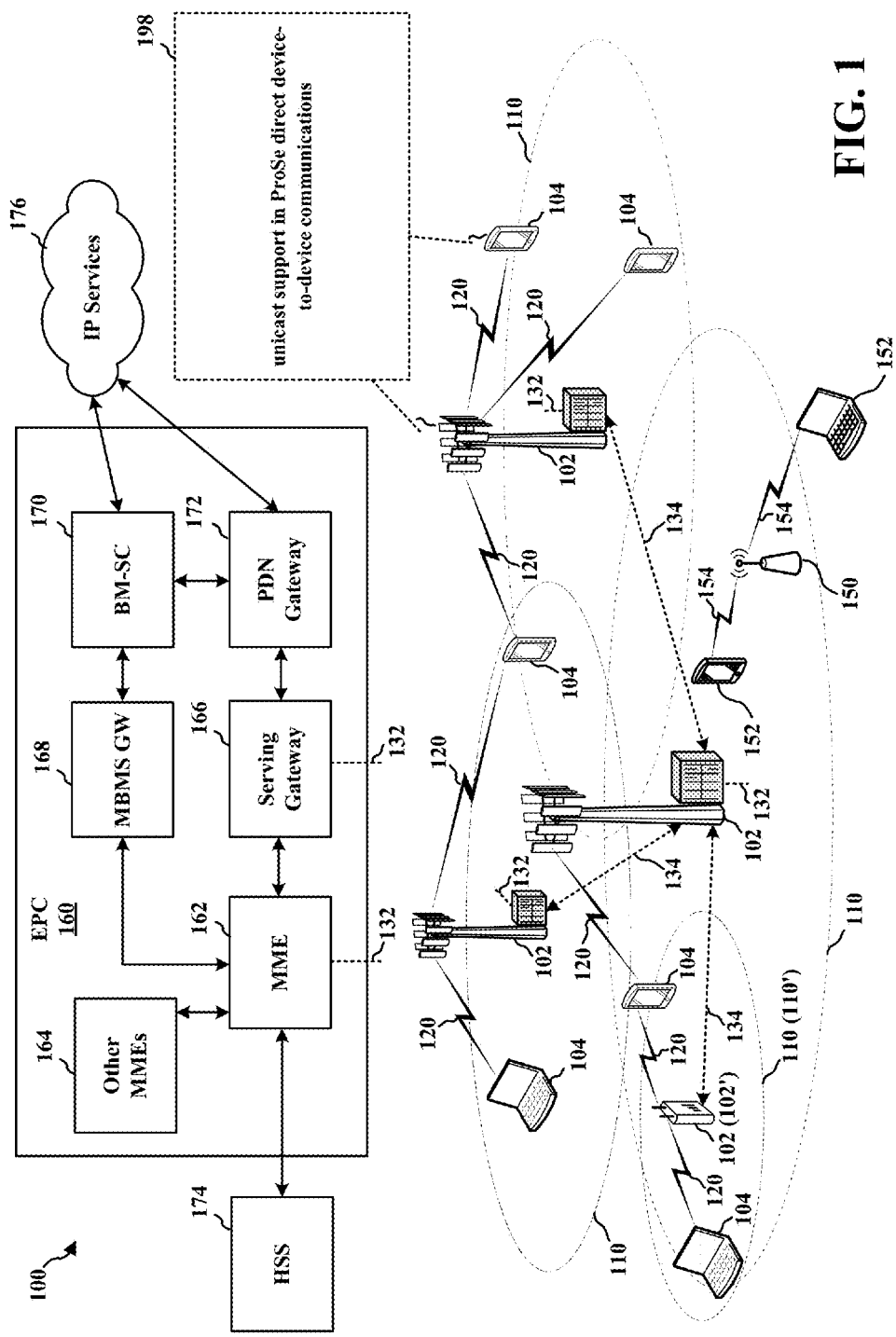
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured for unicast support in ProSe direct device-to-device communications (198).

Figure 2:
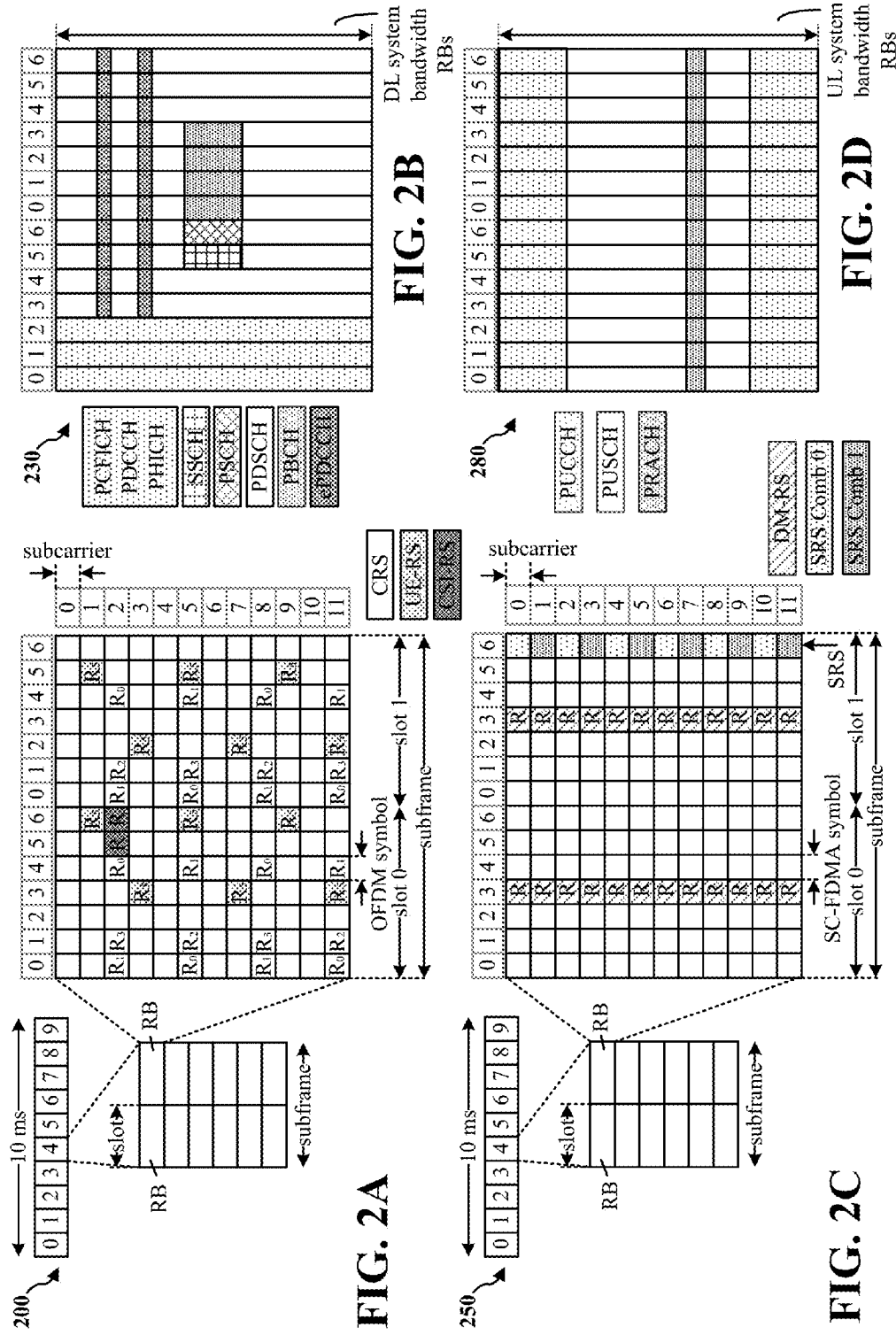
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may be 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
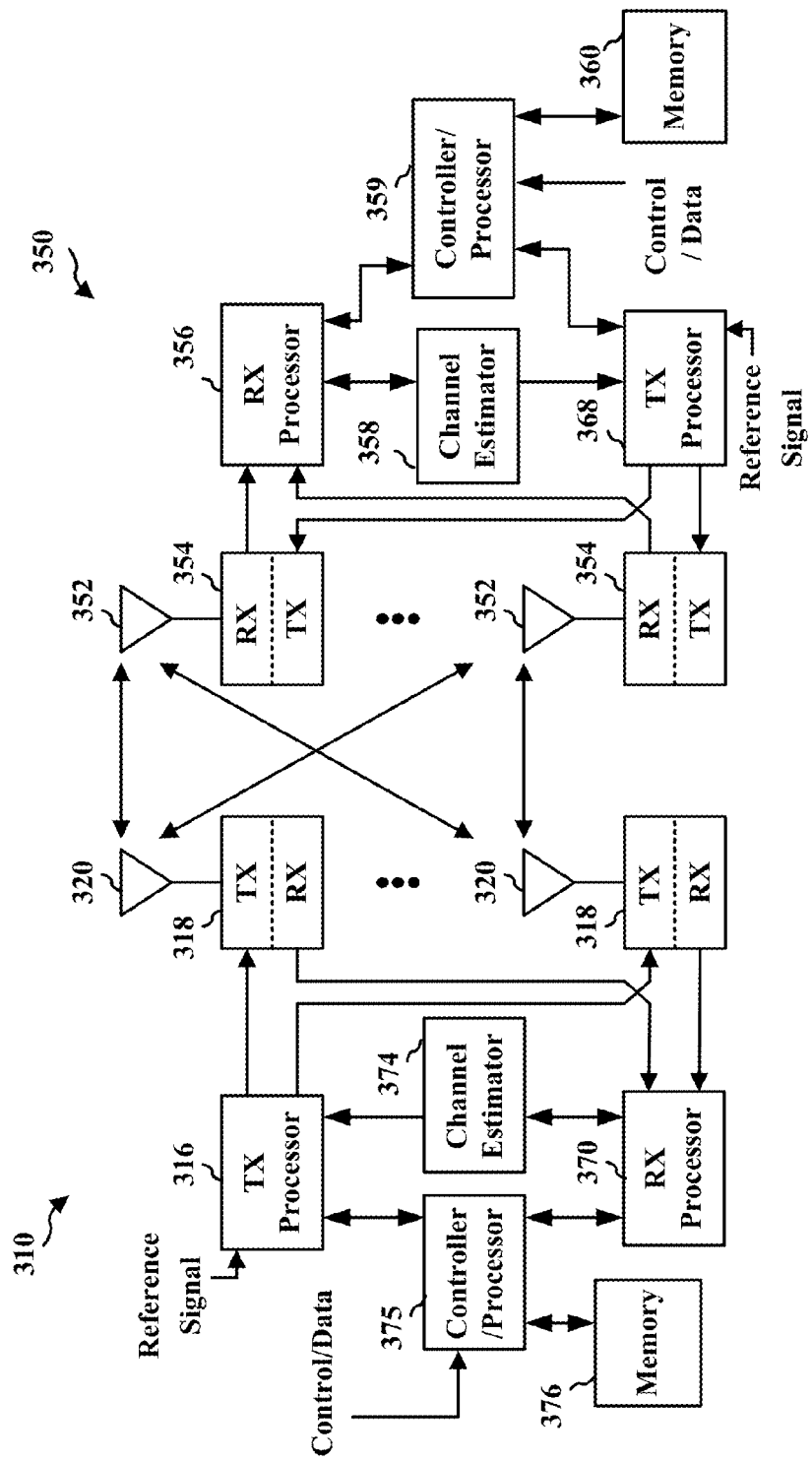
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a PDCP layer, a RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
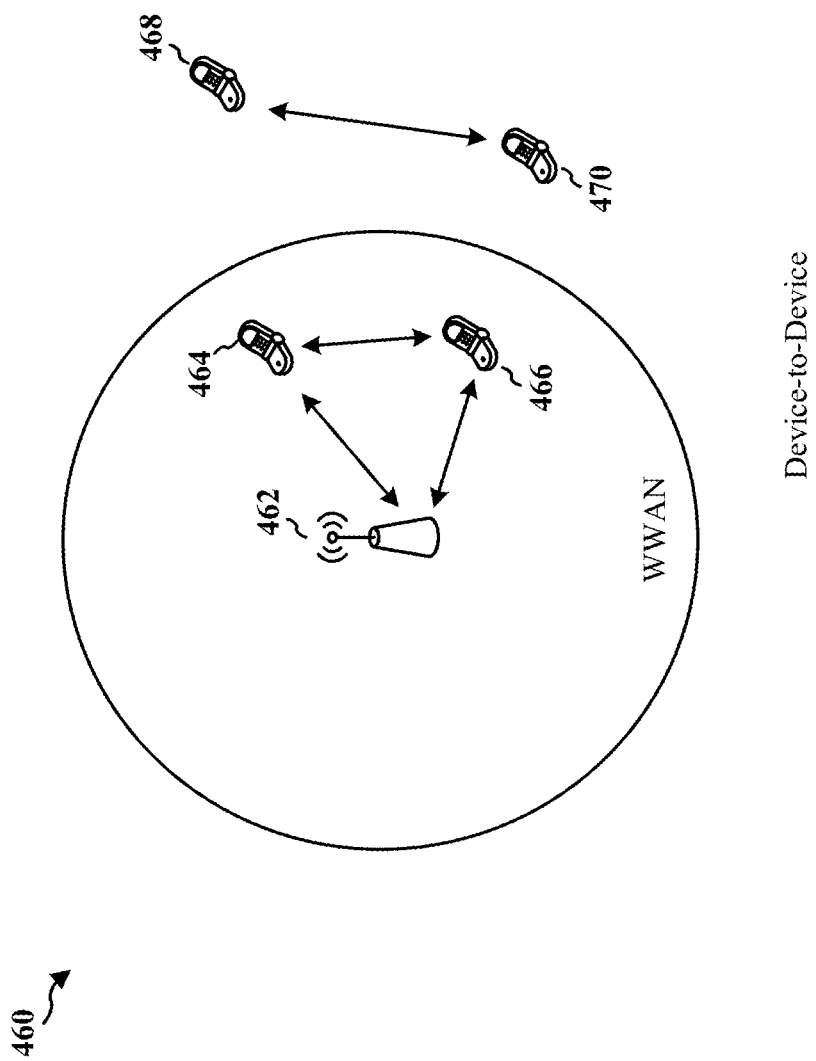
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In general, it is possible that a receiving UE may receive packets associated with a multicast device-to-device communication and unicast device-to-device communication at the same time. If the destination Layer 2 Group ID of the multicast device-to-device and the destination Layer 2 UE ID of the unicast device-to-device communication happen to collide (e.g., take the same value), the receiving UE may discard one or more of the received communications because the security protection may not check out. Additionally, if a unicast data packet included in the unicast device-to-device communication does not have security protection, the unicast data packet received by a receiving UE might advance to higher layer, e.g. IP layer. Such behavior may cause potential radio link control (RLC) layer and a packet data convergence protocol (PDCP) layer counters to be out of order, and thus cause packet drop.

Thus, there is a need to enable a receiving UE to differentiate a unicast device-to-device communication from a multicast device-to-device communication when the two communications are received simultaneously.

Figure 5:
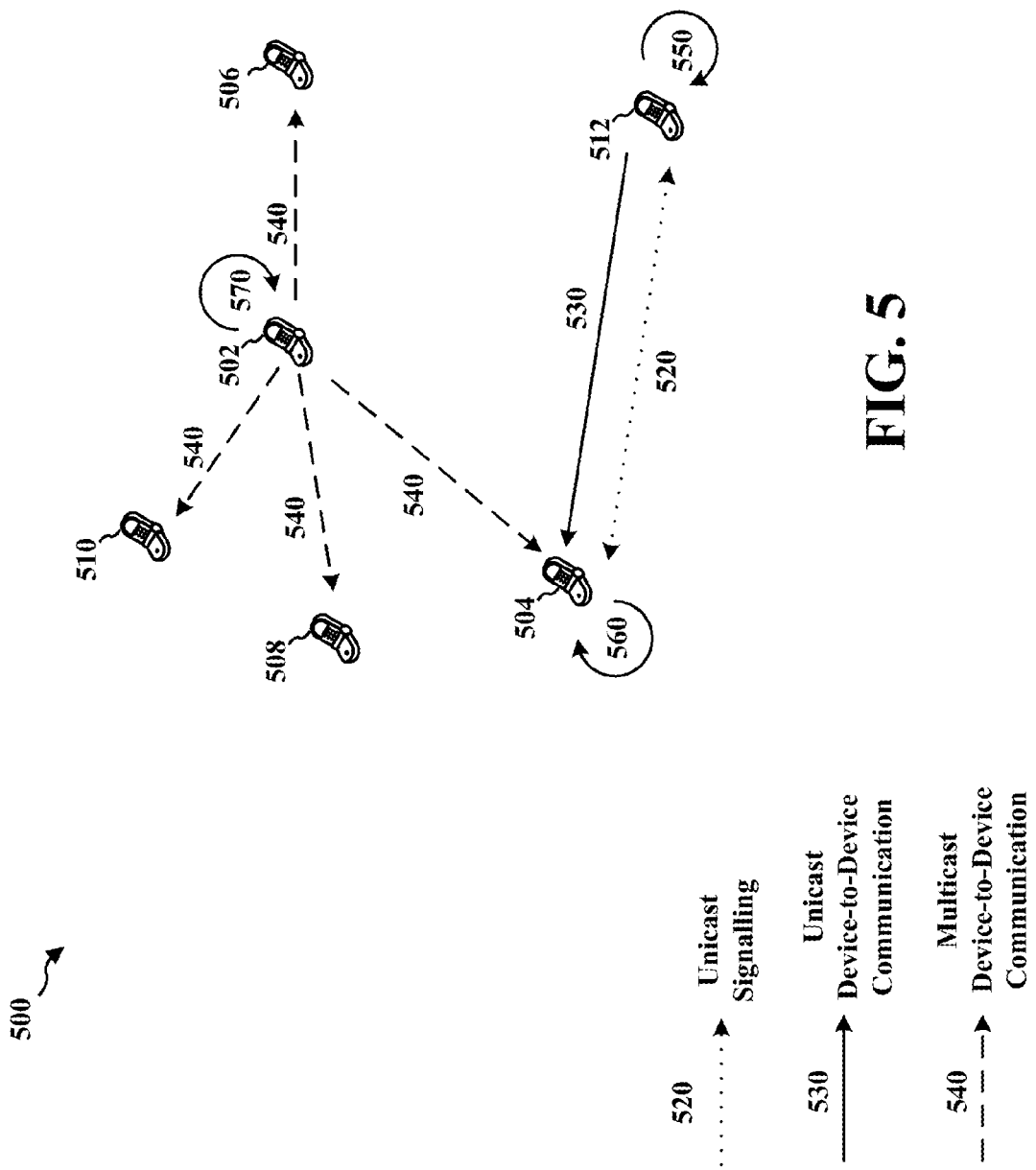
FIG. 5 is a diagram illustrating a device-to-device communications system in accordance with one aspect of the present disclosure.

FIG. 5 is a diagram of a device-to-device communications system 500 in which a unicast device-to-device communication may be differentiated from a multicast device-to-device communication by a receiving UE 504. The device-to-device communications system 500 includes a plurality of UEs 502, 504, 506, 508, 510, and 512. For example, as shown in FIG. 5, UE 502 transmits a multicast device-to-device communication 540 to UEs 504, 506, 508, 510 and UE 512 transmits a unicast device-to-device communication 530 to UE 504. For example, UE 502 may transmit the multicast device-to-device communication 540 to UEs 504, 506, 508, 510 using the DL/UL WWAN spectrum. In an aspect, UE 512 may also transmit the unicast device-to-device communication 530 to UE 504 using the DL/UL WWAN spectrum. Although not illustrated in FIG. 5, one or more of the UEs 502, 504, 506, 508, 510, 512 may also be in communication with a base station, such as base station 462 illustrated in FIG. 4.

Referring to FIG. 5, UE 504 and UE 512 may perform unicast signaling 520 to establish parameters of a communication channel between UE 504 and UE 512. Unicast signaling 520 may precede the unicast device-to-device communication 530, and may be used to negotiate parameters that are acceptable to both UE 504 and UE 512. In an aspect, the parameters negotiated during the unicast signaling 520 may include, but are not limited to, data transfer rate, coding alphabet, parity, interrupt procedure, and other protocol or hardware features.

Still referring to FIG. 5, UE 504 may receive a unicast device-to-device communication 530 from UE 512 and a multicast device-to-device communication 540 from UE 502. In an aspect, the multicast device-to-device communication 530 and the unicast device-to-device communication 520 may be simultaneously, or nearly simultaneously, received by UE 504. Prior to transmission, UE 512 may configure 550 the unicast device-to-device communication 530 and/or UE 502 may configure 570 the multicast device-to-device communication 540 such that UE 504 will be able to distinguish between the unicast and multicast device-to-device communications 530, 540. For example, information in the header of one or more of the unicast device-to-device communication 530 and/or the multicast device-to-device communication 540 can be configured 550, 570 such that that two communication will be distinguishable from one another by UE 504. Based on the information configured in the header(s) by UE 512 and/or UE 502, UE 504 may differentiate 560 the unicast device-to-device communication 530 from the multicast device-to-device communication 540.

In a first example embodiment, the information configured 550, 570 in the header(s) by UE 512 and/or UE 502 may be a version number. The header can be, for example, a MAC layer subheader that is included in the unicast device-to-device communication 530 and/or the multicast device-to-device communication 540, as discussed supra with respect to FIG. 6.

Figure 6:
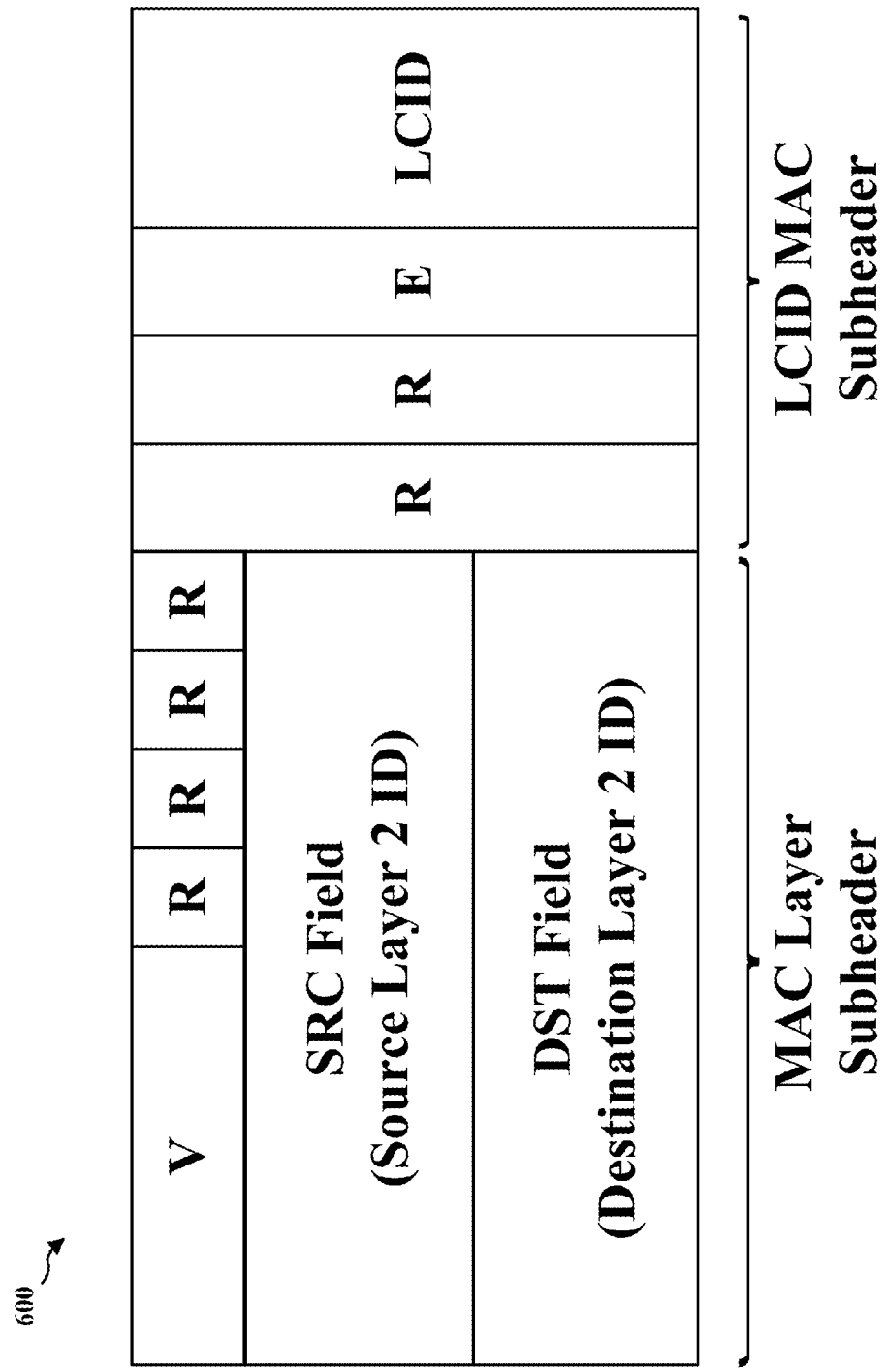
FIG. 6 is a diagram of a media access control (MAC) header in accordance with one aspect of the present disclosure.

FIG. 6 illustrates an exemplary MAC header 600 made up of a MAC layer subheader and a Logical Channel Identifier (LCID) MAC Subheader that may be included in the unicast device-to-device communication 530 and/or a multicast device-to-device communication 540. In an aspect, the MAC layer subheader may be made up of a "V" field (e.g., MAC PDU format version number field) that includes a version number (e.g., a MAC PDU format version number), four reserved "R" fields that may be set to "0", a source (SRC) field that includes the Source Layer 2 ID (e.g., sending UE ID), and a destination (DST) field that includes the Destination Layer 2 ID (e.g., the receiving UE ID). In an aspect, the LCID MAC subheader may be made up of two reserved "R" fields that can be set to "0", an extension "E" field that indicates if another subheader follows the LCID MAC subheader in the MAC header, and a Logical Channel ID field, which may include a logical channel number.

In an aspect, the version number of the V field in the MAC layer subheader 600 that is included in the multicast device-to-device communication 540 may be set to a first value. For example, the version number for multicast device-to-device communications 540 may be set as "0001". The version number of the "V" field in the MAC layer subheader that is included in the unicast device-to-device communication 530 may be set to a value that is different than that used in MAC layer subheader of the multicast device-to-device communication 540. For example, the version number for unicast device-to-device communication 530 may be set as "0010". In an aspect, the V field may indicate which version of the sidelink shared channel (SL-SCH) subheader is used. In an aspect, two format versions are defined, and this field shall therefore be set to "0001" or "0010". The V field size may be 4 bits.

In another aspect, referring to FIG. 6, the Source Layer-2 ID field may carry the identity of the source (e.g., the transmitting UE 502, 512). The SRC field may be set to the ProSe UE ID of the transmitting UE 502, 512. The SRC field size may 24 bits. If the V field is set to "0001", this identifier may be a multicast (e.g. groupcast) identifier. If the V field is set to "0010", this identifier may be a unicast identifier.

In a further aspect, referring to FIG. 6, the DST field may carry the 16 most significant bits of the Destination Layer-2 ID. The Destination Layer-2 ID may be set to the ProSe Layer-2 Group ID. If the V field is set to "0001", this identifier may be a multicast (e.g., groupcast) identifier. If the V field is set to "0010", this identifier may be a unicast identifier.

Still further, referring to FIG. 6, the LCID field may uniquely identify the logical channel instance within the scope of one Source Layer-2 ID and Destination Layer-2 ID pair of the corresponding MAC SDU or padding as described below in Table 1. There may be one LCID field for each MAC SDU or padding included in the MAC PDU. In addition, one or two additional LCID fields may be included in the MAC PDU, when single-byte or two-byte padding cannot be achieved by padding at the end of the MAC PDU. For example, the LCID field size may be 5 bits.

TABLE 1

Values of LCID for SL-SCH

| Index | LCID values |
|---|---|
| 00000 | Reserved |
| 00001- 01010 | Identity of the logical channel |
| 01011- 11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

In addition, referring to FIG. 6, a length (L) field (not shown) may be included that indicates the length of the corresponding MAC SDU in bytes. There may be one L field per MAC PDU subheader except for the last subheader. The size of the L field may be indicated by a format (F) field (not shown).

Referring again to FIG. 6, the F field may indicate the size of the L field as indicated below in Table 2. There may be one F field per MAC PDU subheader except for the last subheader. The size of the F field may be 1 bit. If the size of the MAC SDU is less than 128 bytes, the value of the F field may be set to 0, otherwise the value of the F field may be set to 1.

TABLE 2

Values of F field

| Index | Size of Length field (in bits) |
|---|---|
| 0 | 7 |
| 1 | 15 |

Still further, referring to FIG. 6, the E field may be a flag indicating if more fields are present in the MAC header or not. The E field may be set to "1" to indicate another set of at least R/R/E/LCID fields. The E field may be set to "0" to indicate that either a MAC SDU or padding starts at the next byte.

Referring again to FIG. 5, UE 502 may configure 570 the version number included in the "V" field of the MAC layer subheader to "0001" for the multicast device-to-device communication 540, which is identified as IP multicast traffic at the IP layer. UE 512 may configure 550 the version number included in the "V" field of the MAC layer subheader to "0010" for the unicast device-to-device communication 530, which is identified as IP unicast traffic at IP layer. In an aspect, when the upper layer passes the IP traffic down to the MAC layer (e.g., PDCP layer in the sending UE 502, 512), the upper layer may include an indicator that the IP traffic is either a unicast communication or a multicast communication, such that the MAC layer can set the "V" field accordingly.

UE 504 may differentiate 560 the unicast device-to-device communication 530 from the multicast device-to-device communication 540 based on the respective version numbers included in the "V" field of the MAC layer subheaders 600 in each of the communications. In this way, the receiving UE 504 may differentiate the unicast device-to-device communication 530 from the multicast device-to-device communication 540, avoid having the RLC and PDCP layer counter be out of order, and thus avoid packet drop.

In an aspect, a receiving UE 504, 506, 508, 510 may perform data processing of a received communication based at least in part on the Destination L2 ID (e.g., the 16 bits value in the DST field and the 8 bits from the source address), the SRC value, and/or the "V" field. This will allow the MAC layer at a receiving UE 504, 506, 508, 510 to decide if the communication should be received, and what security materials to use for processing.

In a second example embodiment, referring still to FIG. 5, the information configured 550, 570 in the header by UE 512 and/or UE 502 may be an SDU identifier. The header may be a PDCP header that is included in the unicast device-to-device communication 530 and/or the multicast device-to-device communication 540, as discussed supra in FIG. 7.

FIG. 7 illustrates a PDCP header 700 that may be included in one or more of the unicast device-to-device communication 530 and/or the multicast device-to-device communication 540. For example, the PDCP header may include a table that correlates an SDU identifier (e.g., bit field value) with an SDU type.

In the example illustrated in FIG. 7, an SDU identifier of "000" may be related to an IP for a multicast device-to-device communication 540, an SDU identifier of "001" may be related to an address resolution protocol (ARP), and an SDU identifier of 010-111 may be related to the IP for a unicast device-to-device communication 530.

In an aspect, one way to differentiate the unicast device-to-device communication 530 from the multicast device-to-device communication 540 may be to include a different SDU identifier in the PDCP header in each of the unicast and multicast device-to-device communications. For example, the SDU identifier (e.g., bit field value) for PDCP header included in unicast device-to-device communications may be set to "010-111" and "000" for the multicast device-to-device communications.

Referring again to FIG. 5, UE 502 may configure 570 the SDU identifier of the PDCP header as "000" for the multicast device-to-device communication 540, which may be identified as IP multicast traffic at the IP layer. UE 512 may configure 550 the SDU identifier of the PDCP header as "010-111" for the unicast device-to-device communication 530, which is identified as IP unicast traffic at IP layer. In an aspect, when the upper layer pass the IP traffic down to the MAC layer (e.g. PDCP layer in the sending UE 502, 512), the IP traffic may include the indicator that the transmission is either a unicast or multicast communication, such that the MAC layer and/or the PDCP layer may set the SDU identifier accordingly.

UE 504 may differentiate 560 the unicast device-to-device communication 530 from the multicast device-to-device communication 540 based on the SDU identifiers of PDCP header in each communication. In this way, the receiving UE 504 may differentiate the unicast device-to-device communication 530 from the multicast device-to-device communication 540, avoid having the RLC and PDCP layer counter to be out of order, and thus avoid packet drop.

In an aspect, a receiving UE 504, 506, 508, 510 may perform data processing of a received communication based at least in part on the Destination L2 ID (e.g., the 16 bits value in the DST field and the 8 bits from the source address), the SRC value, and the bit field value in the PDCP header. This may allow the MAC layer and/or PDCP layer at a receiving UE 504, 506, 508, 510 to decide if the communication should be received, and what security materials to use for processing.

In a third example embodiment, referring still to FIG. 5, the information configured 550, 570 in the header configured by UE 512 and/or UE 502 may be one or more of a value of an identifier of a group security key and/or a value of an identifier of the encryption key included in a PDCP header. Additional details of the third example embodiment are discussed supra with respect to FIG. 8.

Figure 8:
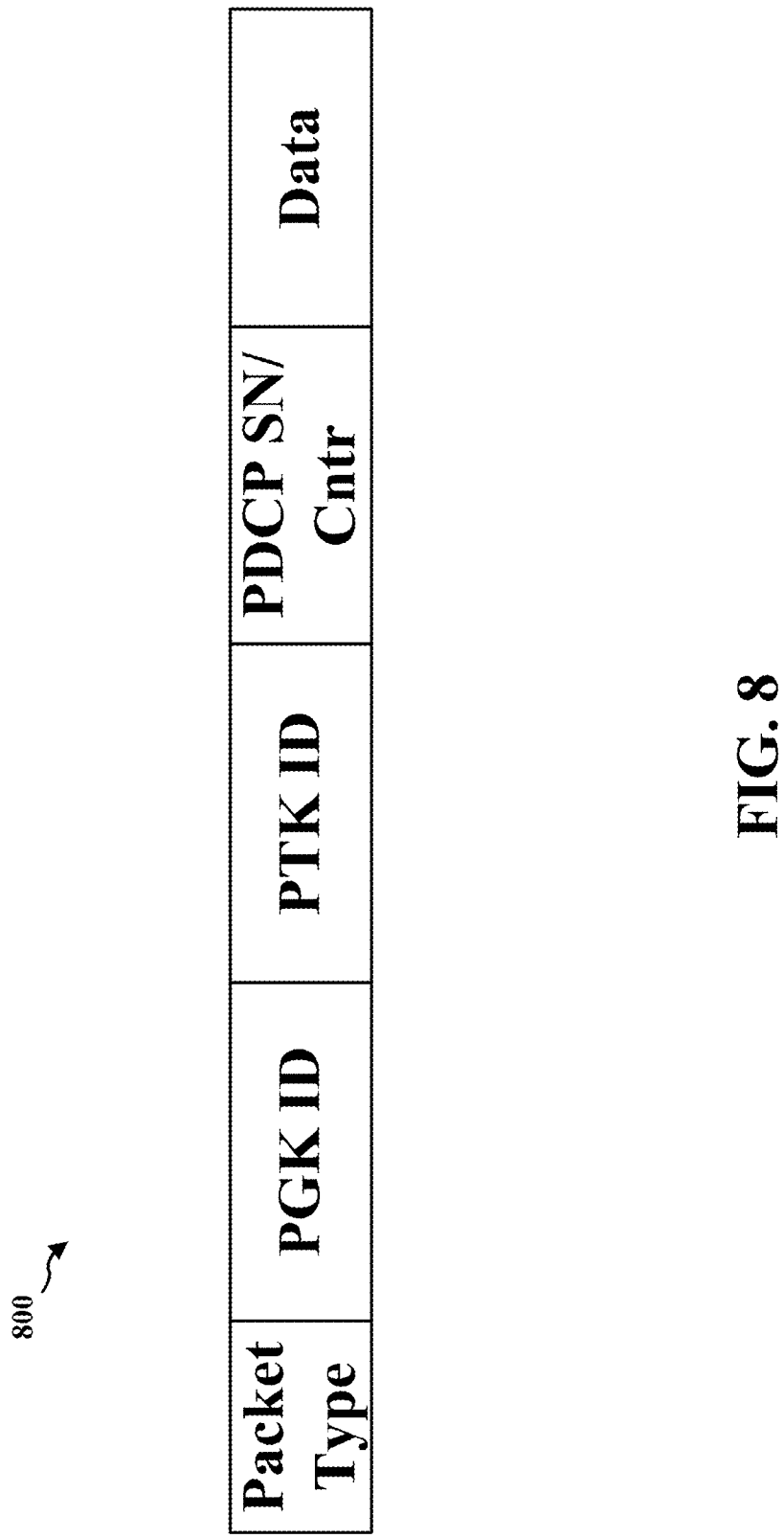
FIG. 8 is a PDCP header in accordance with one aspect of the present disclosure.

FIG. 8 illustrates a PDCP header 800 that includes packet type field (e.g., 3 bits), a ProSe group key ID (PGK ID) (e.g., 5 bits), a ProSe traffic key ID (PTK ID) (e.g., 16 bits), PDCP sequence number (SN) (e.g., 16 bits), and encrypted or unencrypted data.

If encryption is applied, then the PGK ID may contain the identifier of the ProSe group key, while the PTK ID may contain the identifier of the ProSe traffic key (e.g., which may be specific to the sender UE and not the group). If encryption is not applied, then the value of both the PGK ID and the PTK ID may be set to zero. In order to signal a unicast device-to-device communication that is not protected by a group key (PGK), UE 512 may configure 550 the value of PGK ID to zero and the value of the PTK ID is set to a non-zero value. For example, the value of the PTK ID may be configured 550 based on an identifier of the key established between the sender UE 512 and receiver UE 504 during unicast signaling 520.

Referring again to FIG. 5, UE 512 may configure 550 the value of the PGK ID as "0" and the value of the PTK ID, which is identified as "non-zero". Thus, indicating to UE 504 that the communication transmitted by UE 512 is a unicast device-to-device communication 530. In this way, the receiving UE 504 may differentiate the unicast device-to-device communication 530 from the multicast device-to-device communication 540, avoid having the RLC and PDCP layer counter to be out of order, and thus avoid packet drop.

Figure 9A:
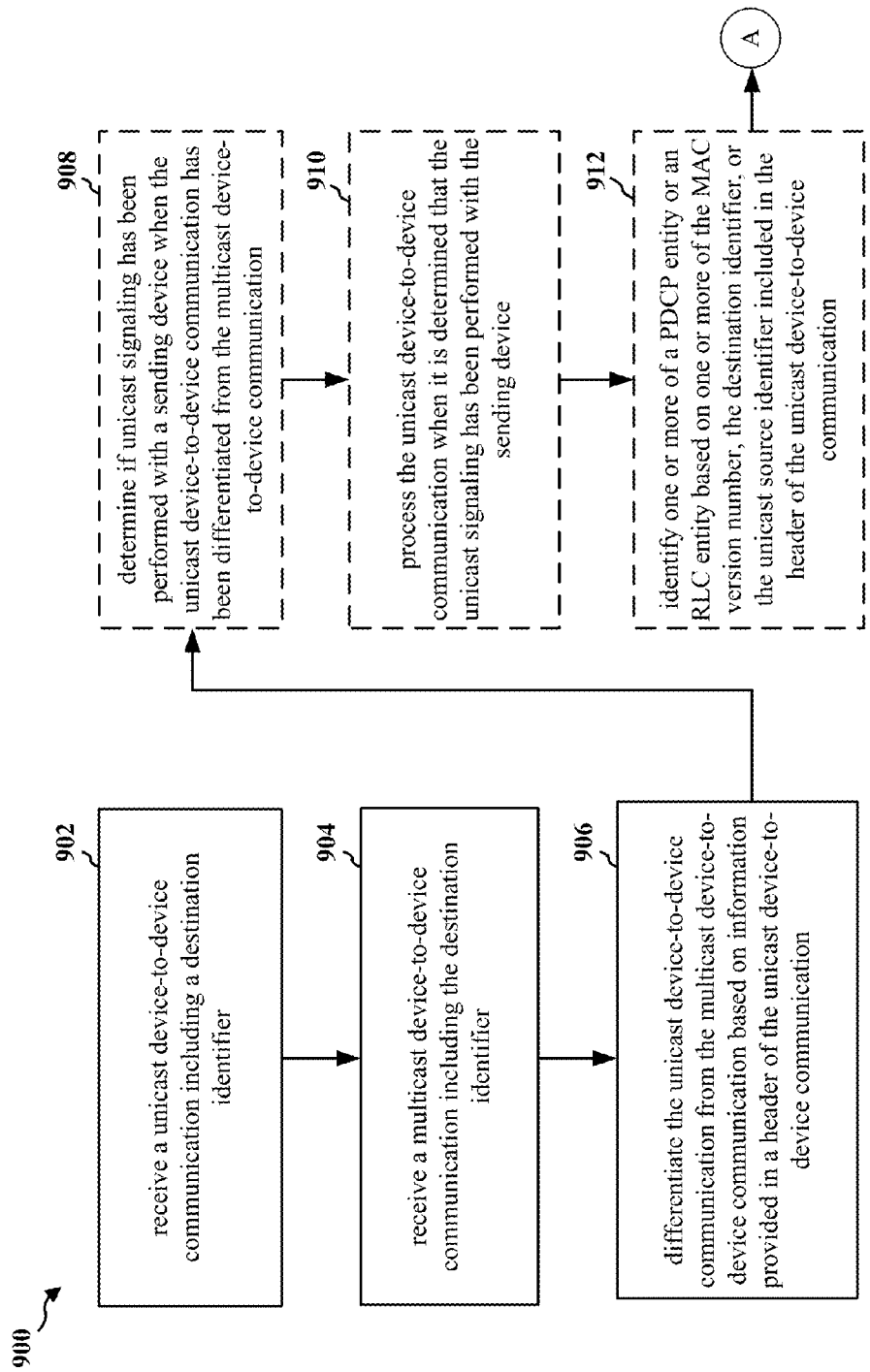
FIGS. 9A and 9B are a flowchart of a method of wireless communication.
Figure 9B:
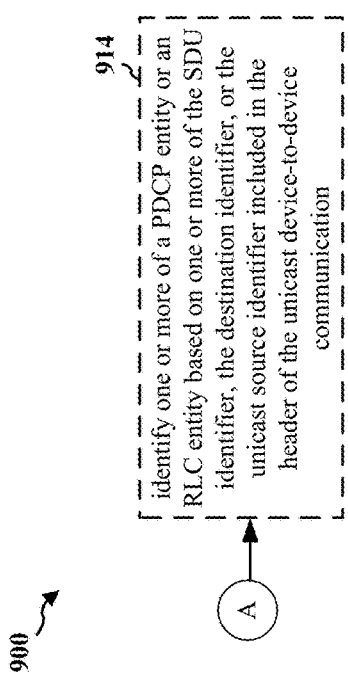

FIGS. 9A and 9B are a flow chart 900 of a method of wireless communication in accordance with various aspects. The method may be performed by a UE (e.g., the UE 504, the apparatus 1002/1002'). It should be understood that the operations indicated with dashed lines represent operations for various aspects of the disclosure.

At 902, a UE may receive a unicast device-to-device communication including a destination identifier. For example, referring to FIG. 5, UE 504 may receive a unicast device-to-device communication 530 via the DL/UL WWAN spectrum from UE 512. In an aspect, the destination identifier may be a Layer 2 UE ID. For example, the Layer 2 UE ID used in a unicast device-to-device communication may be chosen either by the receiving UE itself or by an administrator of the communication for this UE (e.g., the sending UE).

At 904, the UE may receive a multicast device-to-device communication including the destination identifier. For example, referring to FIG. 5, UE 504 may receive a multicast device-to-device communication 540 via the DL/UL WWAN spectrum from UE 502. In an aspect, the destination identifier may be a Layer 2 UE ID. For example, the Layer 2 UE ID used in a multicast device-to-device communication may be chosen either by the receiving UE itself or by an administrator of the communication for this UE (e.g., the sending UE).

At 906, the UE may differentiate the unicast device-to-device communication from the multicast device-to-device communication based on information provided in a header of the unicast device-to-device communication.

In an aspect, the UE may differentiate the unicast device-to-device communication from the multicast device-to-device communication based on the MAC version number provided in the header of the unicast device-to-device communication. For example, referring to FIGS. 5 and 6, UE 504 may differentiate 560 the unicast device-to-device communication 530 from the multicast device-to-device communication 540 based on the respective version numbers included in the "V" field of the MAC layer subheaders provided in each communication.

In another aspect, the UE may differentiate the unicast device-to-device communication from the multicast device-to-device communication based on the SDU identifier provided in the header of the unicast device-to-device communication. For example, referring to FIGS. 5 and 7, UE 504 may differentiate 560 the unicast device-to-device communication 530 from the multicast device-to-device communication 540 based on the SDU identifiers of PDCP header provided in each communication.

In a further aspect, the UE may differentiate the unicast device-to-device communication from the multicast device-to-device communication based on a value of the identifier of group security key and a value of the identifier of the encryption key. For example, referring to FIGS. 5 and 8, when the value of PGK ID is "0" and the value of the PTK ID is "non-zero", this may indicate to the UE 504 that the communication is a unicast device-to-device communication 530.

At 908, the UE may determine if unicast signaling has been performed with a sending device when the unicast device-to-device communication has been differentiated from the multicast device-to-device communication. For example, referring to FIG. 5, UE 504 and UE 512 may perform unicast signaling 520 to establish parameters of a communication channel between UE 504 and UE 512. Unicast signaling 520 may precede the unicast device-to-device communication 530, and may be used to negotiate parameters that are acceptable to both UE 504 and UE 512. In an aspect, the parameters negotiated during the unicast signaling 520 may include, but are not limited to data transfer rate, coding alphabet, parity, interrupt procedure, and other protocol or hardware features.

At 910, the UE may process the unicast device-to-device communication when it is determined that the unicast signaling has been performed with the sending device. In an aspect, the UE may process the unicast device-to-device communication based on one or more of the MAC version number, the destination identifier, or the unicast source identifier included in the header of the unicast device-to-device communication. In an aspect, the UE may process the unicast device-to-device communication based on one or more of the SDU identifier, the destination identifier, or the unicast source identifier included in the header of the unicast device-to-device communication. In an aspect, the UE may process the unicast device-to-device communication based at least in part on the identifier of the group security key and the identifier of the encryption key.

At 912, the UE may identify one or more of a PDCP entity or an RLC entity based on one or more of the MAC version number, the destination identifier, or the unicast source identifier included in the header of the unicast device-to-device communication.

Figure 10:
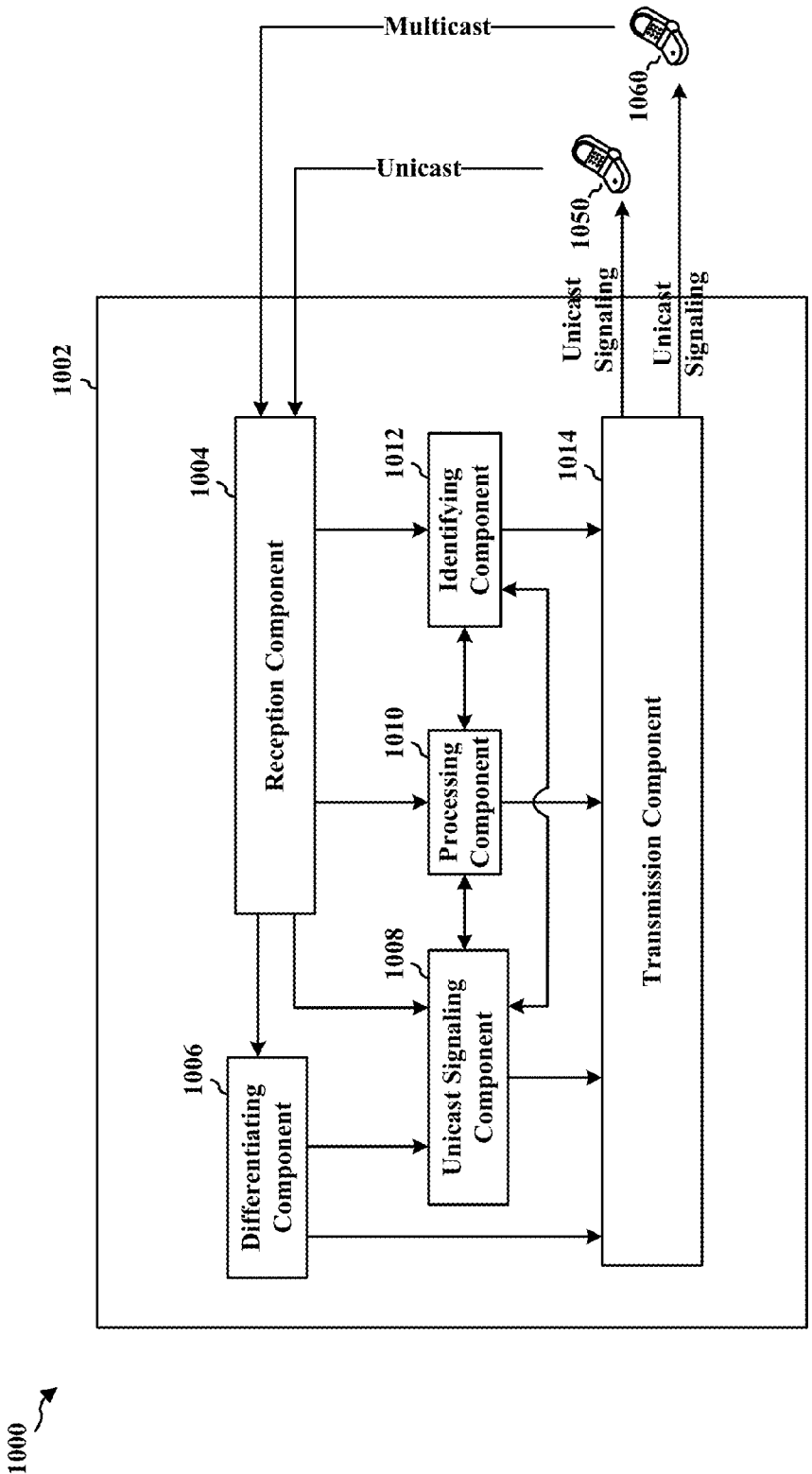
FIG. 10 is a conceptual data flow diagram illustrating the data flow between different means/components in an exemplary apparatus.

As shown in FIG. 9B, at 914, the UE may identify one or more of a PDCP entity or an RLC entity based on one or more of the SDU identifier, the destination identifier, or the unicast source identifier included in the header of the unicast device-to-device communication FIG. 10 is a conceptual data flow diagram 1000 illustrating the data flow between different means/components in an exemplary apparatus 1002. For example, the apparatus may be a receiving UE (e.g., UE 504 in FIG. 5). The apparatus includes a unicast signaling component 1008 that performs unicast signaling with sending UE 1050. The apparatus also includes a processing component 1010 that may send signals associated with the unicast signaling to transmission component 1014. The apparatus further includes a transmission component 1014 that may transmit information associated with the unicast signaling to one or both of the sending UEs 1050, 1060. The apparatus further includes a reception component 1004 that may receive a unicast device-to-device communication from sending UE 1050 and a multicast device-to-device communication from sending UE 1060. Reception component 1004 may send a signal to unicast signaling component 1008 related to the unicast signaling. Information associated with the unicast signaling may be stored at unicast signal component 1008. Reception component 1004 may receive a unicast device-to-device communication including a destination identifier from sending UE 1050. In addition, reception component 1004 may receive a multicast device-to-device communication including the destination identifier from sending UE 1060. A signal related to each of the unicast device-to-device communication and the multicast device to device communication may be sent from reception component 1004 to differentiating component 1006. The apparatus additionally includes a differentiating component 1006 that may differentiate the unicast device-to-device communication from the multicast device-to-device communication based on information provided in a header of the unicast device-to-device communication. In an aspect, differentiating component 1006 may differentiate the unicast device-to-device communication from the multicast device-to-device communication. In an aspect, the differentiating component 1006 may use the MAC version number provided in the header of the unicast device-to-device communication for differentiation. In another aspect, the differentiating component 1006 may use the SDU identifier provided in the header of the unicast device-to-device communication for differentiation. In a further aspect, the differentiating component 1006 may use a value of the identifier of group security key and a value of the identifier of the encryption key for differentiation. Differentiating component 1006 may send a signal related to the differentiating of the unicast and multicast device-to-device communications to processing component 1010. Processing component 1010 may process the unicast device-to-device communication based on one or more of the MAC version number, the destination identifier, or the unicast source identifier included in the header of the unicast device-to-device communication. In addition, processing component 1010 may process the unicast device-to-device communication based on one or more of the SDU identifier, the destination identifier, or the unicast source identifier included in the header of the unicast device-to-device communication. Further, processing component 1010 may process the unicast device-to-device communication based at least in part on the identifier of the group security key and the identifier of the encryption key. Unicast signaling component 1008 may determine if unicast signaling has been performed when the unicast device-to-device communication has been differentiated from the multicast device-to-device communication, and send a signal related to the determination to processing component 1010. Processing component 1010 may process the unicast device-to-device communication when it is determined that the unicast signaling has been performed with the sending device. Processing component 1010 may send a signal related to the processing of the unicast device-to-device communication to identifying component 1012. Identifying component 1012 may identify one or more of a PDCP entity or a RLC entity based on one or more of the MAC version number, the destination identifier, the unicast source identifier included in the header of the unicast device-to-device communication, or the logical channel identifier. In addition, the identifying component 1010 may identify one or more of a PDCP entity or a RLC entity based on one or more of the SDU identifier, the destination identifier, the unicast source identifier included in the header of the unicast device-to-device communication, or the logical channel identifier.

The apparatus may include additional components that perform each of the blocks of the algorithm in the aforementioned flowcharts of FIGS. 9A and 9B. As such, each block in the aforementioned flowcharts of FIGS. 9A and 9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
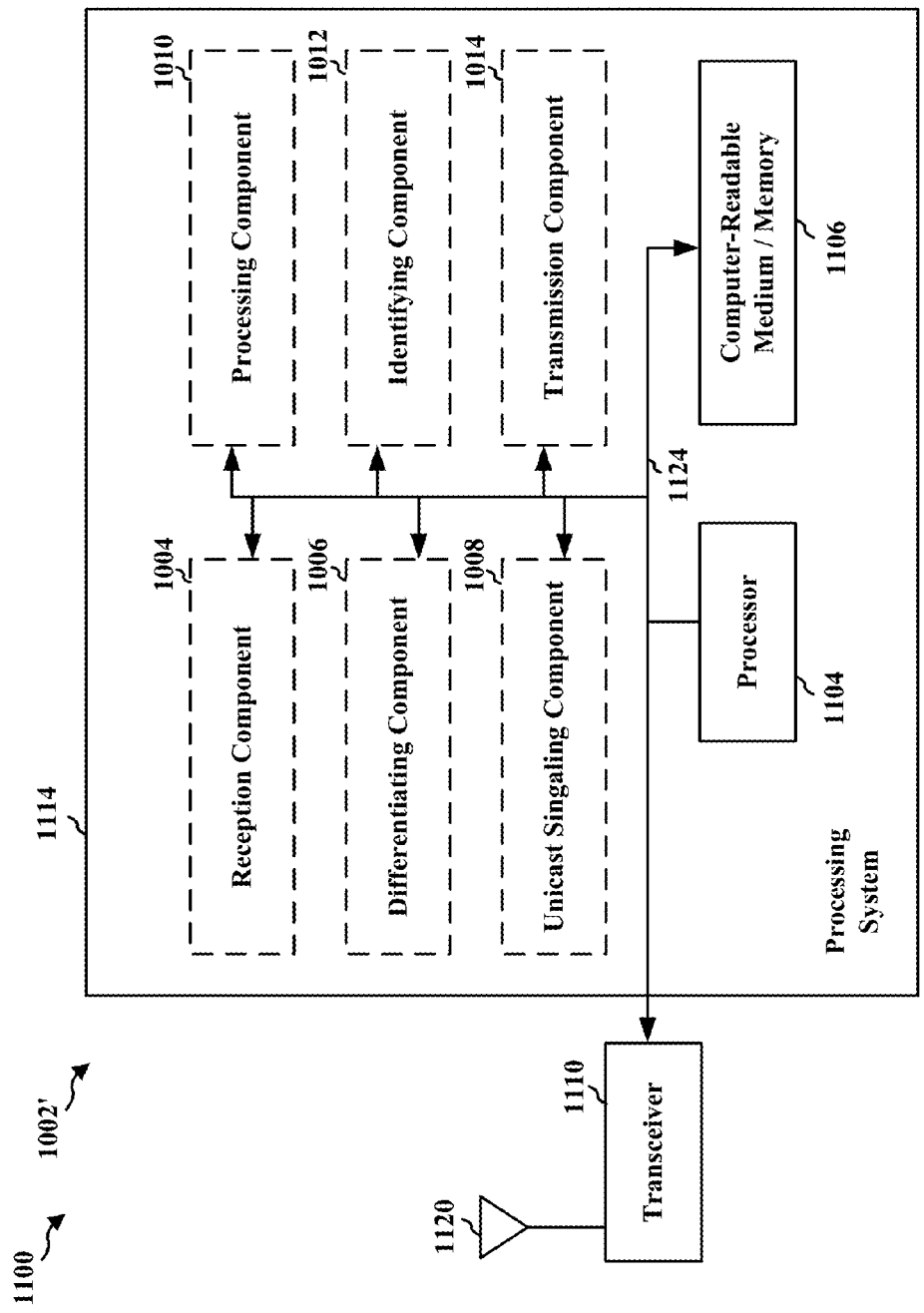
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a unicast device-to-device communication including a destination identifier. In another configuration, the apparatus 1002/1002' for wireless communication includes means for receiving a multicast device-to-device communication including the destination identifier. In a further configuration, the apparatus 1002/1002' for wireless communication includes means for differentiating the unicast device-to-device communication from the multicast device-to-device communication based on information provided in a header of the unicast device-to-device communication. In an aspect, the means for differentiating are configured to differentiate the unicast device-to-device communication from the multicast device-to-device communication based on the MAC version number provided in the header of the unicast device-to-device communication. In another aspect, the means for differentiating is configured to differentiate the unicast device-to-device communication from the multicast device-to-device communication based on the SDU identifier provided in the header of the unicast device-to-device communication. In an additional aspect, the means for differentiating is configured to differentiate the unicast device-to-device communication from the multicast device-to-device communication based on a value of the identifier of group security key and a value of the identifier of the encryption key. In an additional configuration, the apparatus 1002/1002' for wireless communication includes means for determining if unicast signaling has been performed with a sending device when the unicast device-to-device communication has been differentiated from the multicast device-to-device communication. In a further configuration, the apparatus 1002/1002' for wireless communication includes means for processing the unicast device-to-device communication when it is determined that the unicast signaling has been performed with the sending device. In yet another configuration, the apparatus 1002/1002' for wireless communication includes means for processing the unicast device-to-device communication based on one or more of the MAC version number, the destination identifier, or the unicast source identifier included in the header of the unicast device-to-device communication. In a further configuration, the apparatus 1002/

1002' for wireless communication includes means for identifying one or more of a PDCP entity or an RLC entity based on one or more of the MAC version number, the destination identifier, the unicast source identifier included in the header of the unicast device-to-device communication, or the logical channel identifier. In a further configuration, the apparatus 1002/1002' for wireless communication includes means for processing the unicast device-to-device communication based on one or more of the SDU identifier, the destination identifier, or the unicast source identifier included in the header of the unicast device-to-device communication. In another configuration, the apparatus 1002/1002' for wireless communication includes means for identifying one or more of a PDCP entity or an RLC entity based on one or more of the SDU identifier, the destination identifier, the unicast source identifier included in the header of the unicast device-to-device communication, or the logical channel identifier. In yet another configuration, the apparatus 1002/1002' for wireless communication includes means for processing the unicast device-to-device communication based at least in part on the identifier of the group security key and the identifier of the encryption key. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
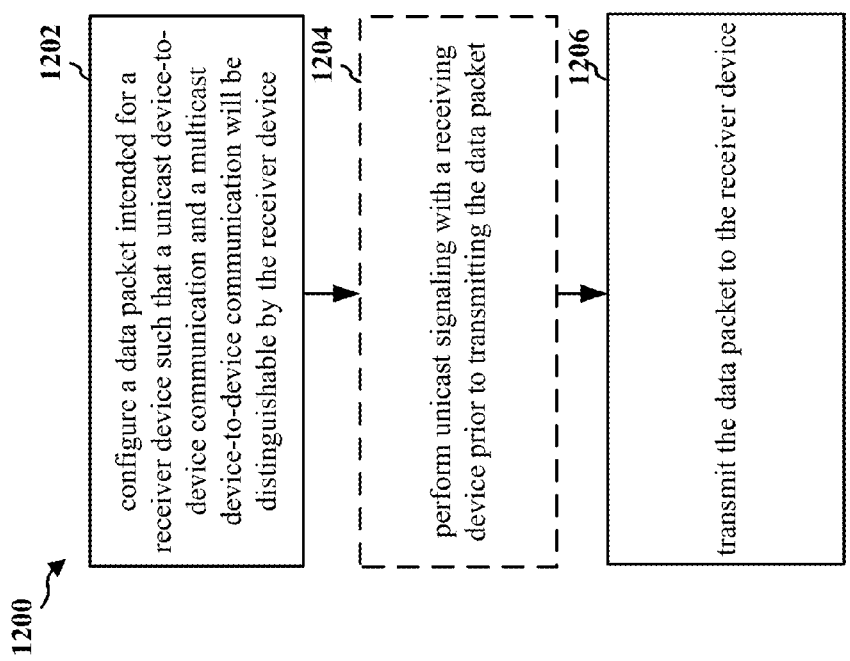
FIG. 12 is a flowchart of a method of wireless communication.

FIG. 12 is a flow chart 1200 of a method of wireless communication in accordance with various aspects. The method may be performed by a sending UE (e.g., such as UE 512). It should be understood that the operations indicated with dashed lines represent operations for various aspects of the disclosure.

At 1202, the UE may configure a data packet intended for a receiver device such that a unicast device-to-device communication and a multicast device-to-device communication will be distinguishable by the receiver device. For example, referring to FIG. 5, UE 512 may configure 550 the unicast device-to-device communication 530 and/or UE 502 may configure 570 the multicast device-to-device communication 540 such that UE 504 will be able to distinguish between the unicast and multicast device-to-device communications 530, 540.

In one aspect, the UE may configure a MAC version number in a data packet header of the data packet that distinguishes the unicast device-to-device communication from the multicast device-to-device communication. For example, referring to FIGS. 5 and 6, UE 502 may configure 570 the version number included in the "V" field of the MAC layer subheader to "0001" for a multicast device-to-device communication 540, which is identified as IP multicast traffic at the IP layer. UE 512 may configure 550 the version number included in the "V" field of the MAC layer subheader to "0010" for a unicast device-to-device communication 530, which is identified as IP unicast traffic at IP layer.

In another aspect, the UE may configure a SDU identifier in a data packet header of the data packet that distinguishes the unicast device-to-device communication from the multicast device-to-device communication. For example, referring to FIGS. 5 and 7, UE 502 may configure 570 the SDU identifier of the PDCP header as "000" for a multicast device-to-device communication 540, which is identified as IP multicast traffic at the IP layer. UE 512 may configure 550 the SDU identifier of the PDCP header as "000" for a unicast device-to-device communication 530, which is identified as IP unicast traffic at IP layer.

In a further aspect, the UE may configure a value of an identifier of a group security key and a value of an identifier of an encryption key in a data packet header of the data packet that distinguishes the unicast device-to-device communication from the multicast device-to-device communication. For example, referring to FIGS. 5 and 11, UE 512 may configure 550 a value of the PGK ID as "0" and a value of the PTK ID as for a unicast device-to-device communication 530, which is identified as "non-zero". Thereby, indicating to UE 504 that the communication transmitted by UE 512 is a unicast device-to-device communication.

At 1204, the UE may perform unicast signaling with a receiving device prior to transmitting the data packet. For example, referring to FIG. 5, UE 504 and UE 512 may perform unicast signaling 520 to establish parameters of a communication channel between UE 504 and UE 512. Unicast signaling 520 may precede the unicast device-to-device communication 530, and may be used to negotiate parameters that are acceptable to both UE 504 and UE 512. In an aspect, the parameters negotiated during the unicast signaling 520 may include, but are not limited to, data transfer rate, coding alphabet, parity, interrupt procedure, and other protocol or hardware features.

At 1206, the UE may transmit the data packet via the unicast device-to-device communication to the receiver device. For example, referring to FIG. 5, UE 504 may receive a unicast device-to-device communication 530 via the DL/UL WWAN spectrum from UE 512, and/or receive a multicast device-to-device communication 540 via 530 via the DL/UL WWAN spectrum from UE 502.

Figure 13:
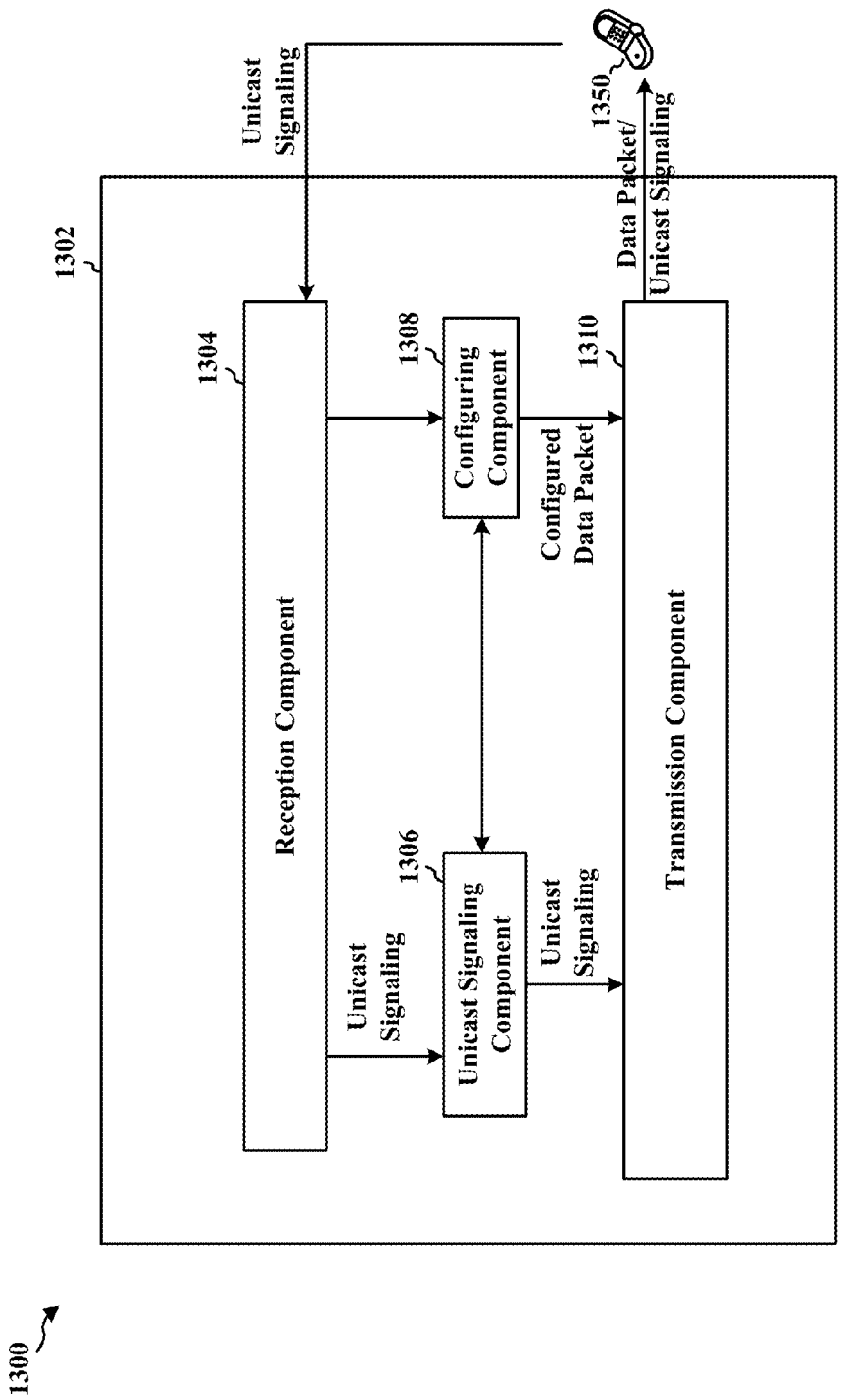
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., such as UE 512).

The apparatus includes a reception component 1304 that receives, from the receiving UE 1350, information related to unicast signaling. Receiving component 1304 may send a signal related to the unicast signaling to unicast signaling component 1306. Unicast signaling component 1306 may determine parameters for communication with receiving UE 1350. Unicast signaling component 1306 may send a signal to transmission component 1312 related to the unicast signaling with receiving UE 1350. Transmission component 1312 may transmit information related to the unicast signaling to the receiving UE 1350. Configuring component 1308 may configure a data packet for a unicast device-to-device communication intended for receiver UE 1350 such that the unicast device-to-device communication will be distinguishable from a multicast device-to-device communication received by the receiver UE 1350. Alternatively, the configuring component 1308 may configure a data packet for a multicast device-to-device communication intended for receiver UE 1350 such that the multicast device-to-device communication will be distinguishable from the unicast device-to-device communication received by the receiver UE 1350. In an aspect, configuring component 1308 may configure the data packet by configuring a MAC version number in a data packet header of the data packet that distinguishes the unicast device-to-device communication from the multicast device-to-device communication. In another aspect, the configuring component 1308 may configure a destination identifier and a unicast source identifier in the data packet header of the data packet. In an additional aspect, the configuring component 1308 may configure an SDU identifier in a data packet header of the data packet that distinguishes the unicast device-to-device communication from the multicast device-to-device communication. In a further aspect, the configuring component 1308 may configure a destination identifier and a unicast source identifier in the data packet header of the data packet. In yet another aspect, the configuring component 1308 may configure a value of an identifier of a group security key and a value of an identifier of an encryption key in a data packet header of the data packet that distinguishes the unicast device-to-device communication from the multicast device-to-device communication. The configuring component 1308 may send a signal related to the configured data packet to the transmission component 1310. The transmission component 1310 may transmit the data packet via a unicast device-to-device communication to the receiver device 1350.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
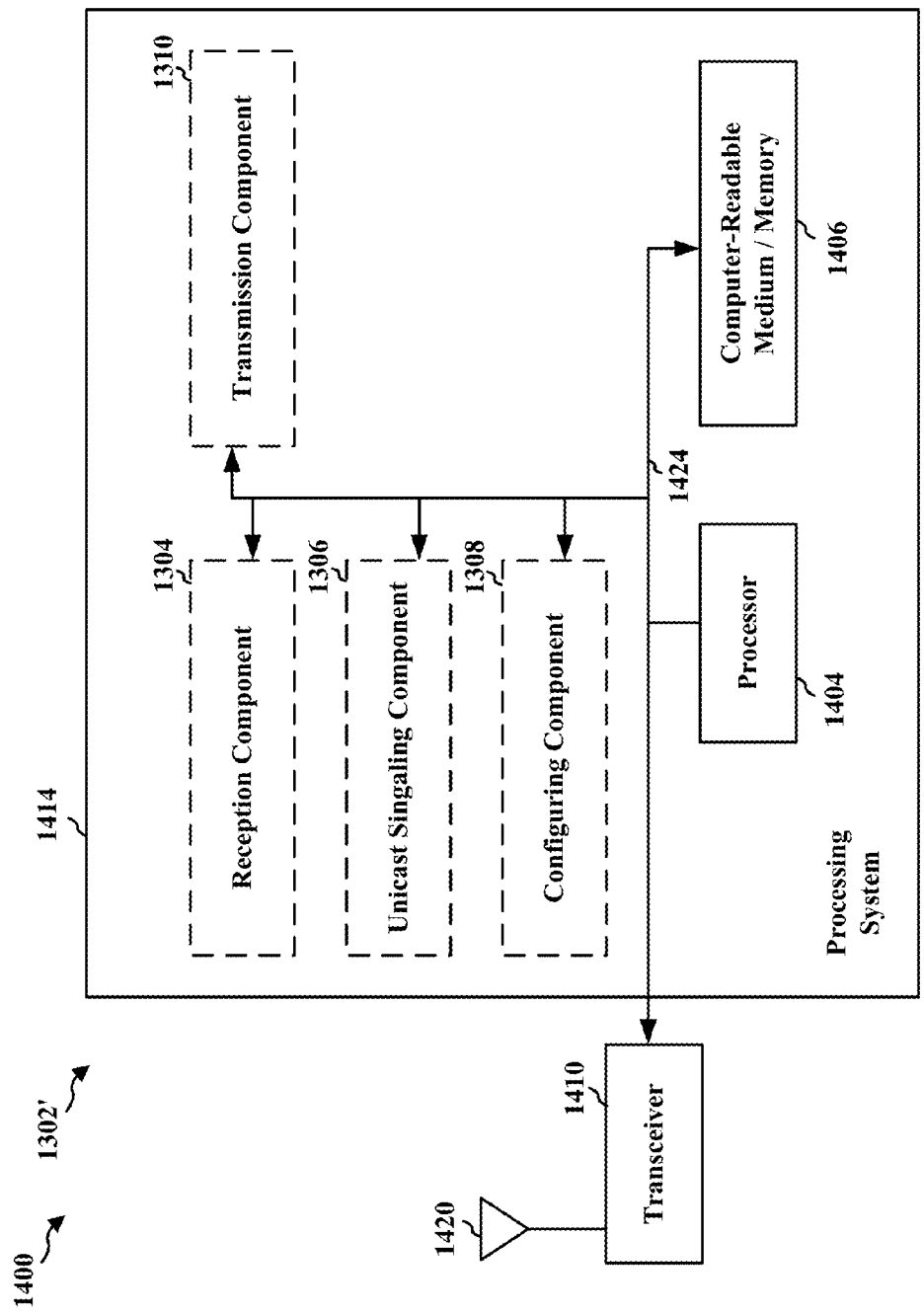
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for configuring a data packet intended for a receiver device such that a unicast device-to-device communication and a multicast device-to-device communication will be distinguishable by the receiver device. In an aspect, the means for configuring is configured to configure a MAC version number in a data packet header of the data packet that distinguishes the unicast device-to-device communication from the multicast device-to-device communication. In another aspect, the means for configuring is configured to configure a destination identifier and a unicast source identifier in the data packet header of the data packet. In an further aspect, the means for configuring is configured to configure an SDU identifier in a data packet header of the data packet that distinguishes the unicast device-to-device communication from the multicast device-to-device communication. In yet another aspect, the means for configuring is configured to configure a destination identifier and a unicast source identifier in the data packet header of the data packet. In a further aspect, the means for configuring is configured to configure a value of an identifier of a group security key and a value of an identifier of an encryption key in a data packet header of the data packet that distinguishes the unicast device-to-device communication from the multicast device-to-device communication. In another configuration, the apparatus 1302/1302' for wireless communication includes means for transmitting the data packet via the unicast device-to-device communication to the receiver device. In a further configuration, the apparatus 1302/1302' for wireless communication includes means for performing unicast signaling with a receiving device prior to transmitting the data packet. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving a unicast device-to-device communication including a destination identifier and a header, the header including a sidelink shared channel (SL-SCH) subheader;
receiving a multicast device-to-device communication including the destination identifier; and
differentiating the unicast device-to-device communication from the multicast device-to-device communication based on a media access control (MAC) version number provided in the SL-SCH subheader in the header of the unicast device-to-device communication.

2. The method of claim 1, further comprising:
determining if unicast signaling has been performed with a sending device when the unicast device-to-device communication is differentiated from the multicast device-to-device communication; and
processing the unicast device-to-device communication when it is determined that the unicast signaling has been performed with the sending device.

3. The method of claim 1, wherein the header of the unicast device-to-device communication comprises the destination identifier and a unicast source identifier.

4. The method of claim 3, further comprising:
processing the unicast device-to-device communication based on one or more of the MAC version number, the destination identifier, or the unicast source identifier included in the header of the unicast device-to-device communication.

5. The method of claim 3, further comprising:
identifying one or more of a packet data convergence protocol (PDCP) entity or a radio link control (RLC) entity based on one or more of the MAC version number, the destination identifier, the unicast source identifier included in the header of the unicast device-to-device communication, or a logical channel identifier.

6. A method of wireless communication, comprising:
configuring a media access control (MAC) version number in a sidelink shared channel (SL-SCH) subheader in a header of a data packet intended for a receiver device such that a unicast device-to-device communication and a multicast device-to-device communication will be distinguishable by the receiver device based on the MAC version number; and
transmitting the data packet to the receiver device.

7. The method of claim 6, further comprising:
performing unicast signaling with the receiver device prior to transmitting the data packet.

8. The method of claim 6, wherein the configuring further comprises configuring a destination identifier and a unicast source identifier in the data packet header of the data packet.

9. An apparatus for wireless communication, comprising:
means for receiving a unicast device-to-device communication including a destination identifier;
means for receiving a multicast device-to-device communication including the destination identifier and a header, the header including a sidelink shared channel (SL-SCH) subheader; and
means for differentiating the unicast device-to-device communication from the multicast device-to-device communication based on a media access control (MAC) version number provided in the SL-SCH subheader in the header of the unicast device-to-device communication.

10. The apparatus of claim 9, further comprising:
means for determining if unicast signaling has been performed with a sending device when the unicast device-to-device communication is differentiated from the multicast device-to-device communication; and
means for processing the unicast device-to-device communication when it is determined that the unicast signaling has been performed with the sending device.

11. The apparatus of claim 9, wherein the header of the unicast device-to-device communication comprises the destination identifier and a unicast source identifier.

12. The apparatus of claim 11, further comprising:
means for processing the unicast device-to-device communication based on one or more of the MAC version number, the destination identifier, or the unicast source identifier included in the header of the unicast device-to-device communication.

13. The apparatus of claim 11, further comprising:
means for identifying one or more of a packet data convergence protocol (PDCP) entity or a radio link control (RLC) entity based on one or more of the MAC version number, the destination identifier, the unicast source identifier included in the header of the unicast device-to-device communication, or a logical channel identifier.

14. An apparatus for wireless communication, comprising:
means for configuring a media access control (MAC) version number in a sidelink shared channel (SL-SCH) subheader in a header of a data packet intended for a receiver device such that a unicast device-to-device communication and a multicast device-to-device communication will be distinguishable by the receiver device based on the MAC version number; and means for transmitting the data packet to the receiver device.

15. The apparatus of claim 14, further comprising:
means for performing unicast signaling with the receiver device prior to transmitting the data packet.

16. The apparatus of claim 14, wherein the means for configuring is configured to configure a destination identifier and a unicast source identifier in the data packet header of the data packet.

* * * * *